(12) United States Patent
Lee

(10) Patent No.: US 7,729,679 B1
(45) Date of Patent: Jun. 1, 2010

(54) DYNAMIC BANDWIDTH FILTER FOR AN FM RECEIVER

(75) Inventor: Chris Cheng-Chieh Lee, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 475 days.

(21) Appl. No.: 11/752,261

(22) Filed: May 22, 2007

Related U.S. Application Data

(60) Provisional application No. 60/812,517, filed on Jun. 9, 2006, provisional application No. 60/815,460, filed on Jun. 21, 2006.

(51) Int. Cl.
*H04B 1/10* (2006.01)
*H04Q 7/20* (2006.01)

(52) U.S. Cl. .................. 455/295; 455/306; 455/307; 375/350

(58) Field of Classification Search ......... 455/295–296, 455/306–307; 375/143, 152, 343, 350
See application file for complete search history.

(56) References Cited

U.S. PATENT DOCUMENTS

| 5,155,862 | A | 10/1992 | Hansen |
| 6,658,245 | B2 | 12/2003 | Li et al. |
| 6,934,387 | B1 | 8/2005 | Kim |
| 6,957,054 | B2 * | 10/2005 | Li ........................ 455/296 |

* cited by examiner

*Primary Examiner*—Lee Nguyen

(57) ABSTRACT

In an apparatus, method, and system for reducing interference with an input signal to an FM receiver, a plurality of inputs are filtered by a first stage of filters. The outputs are received by an interference detector and further processed by a second filtering stage, an energy calculation stage, and a comparator stage. A switch, responsive to the outputs of the comparator stage, may output one of the first stage filter outputs based on a first set of comparator outputs and may output an interpolated value determined by the first stage filter outputs and based on a second set of comparator outputs.

41 Claims, 6 Drawing Sheets

100

200

400

500

600

DYNAMIC BANDWIDTH FILTER FOR AN FM RECEIVER

CROSS REFERENCE TO RELATED APPLICATIONS

The present application claims the benefit of U.S. provisional application Ser. No. 60/812,517, filed on Jun. 9, 2006, and provisional application Ser. No. 60/815,460, filed on Jun. 21, 2006, the disclosures of both provisional applications are incorporated herein by reference in their entirety.

BACKGROUND OF THE INVENTION

1. Field of the Invention

This invention relates generally to a frequency modulation ("FM") receiver, and more particularly to a dynamic bandwidth filter for an FM receiver.

2. Description of the Related Art

Each FM signal possesses a certain bandwidth, or range of frequencies, which influences or affects the amount of data which that signal may transmit. Change in bandwidth can decrease the signal strength or signal-to-noise ratio (SNR) of the FM signal, thereby potentially promoting an adverse effect from interference from adjacent channels, otherwise generally known as crosstalk.

Therefore, it would be desirable to have a method and apparatus that can dynamically change the bandwidth of an FM signal to reduce or eliminate the effects of noise and other interference.

SUMMARY OF THE INVENTION

To address the stated need and fulfill other desired objectives, in accordance with one embodiment of the invention, a first filtering stage filters a plurality of inputs and provides a plurality of outputs to an interference detector. The interference detector receives the outputs and further processes the outputs using a second filtering stage, an energy calculation stage, and a comparator stage and provides comparator outputs. A signal selector may output to the FM receiver one of the first filtering stage outputs based on a first set of comparator outputs and may output to the FM receiver an interpolated value determined by the first filtering stage outputs and based on a second set of comparator outputs.

DETAILED DESCRIPTION OF EMBODIMENTS

Figure 1:
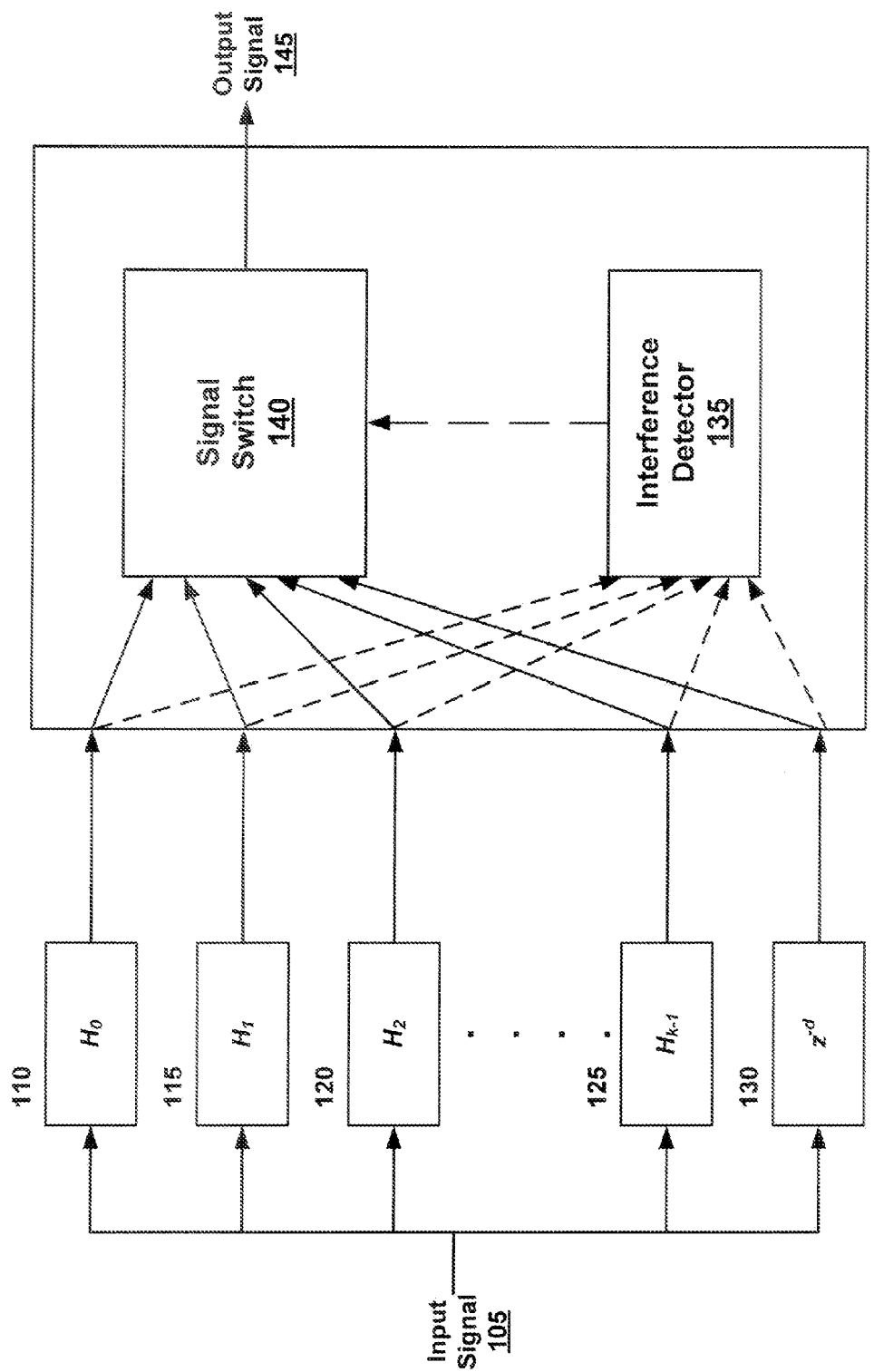
FIG. 1 is a block diagram of one embodiment of a dynamic bandwidth filter architecture for an FM receiver.

FIG. 1 illustrates an embodiment of an adaptive bandwidth filter architecture for an FM receiver. In one embodiment, the FM receiver is an analog receiver. The adaptive bandwidth filter may comprise a plurality of first stage linear filters 110-130, an interference detector 135, and a signal switch 140.

An input signal 105 to an FM receiver may server as an input to the plurality of first stage linear filters 110-130. The first stage linear filters may include low-pass filters of varying bandwidths. In one embodiment, the low-pass filters may be arranged in order of increasing bandwidth, with the linear filter 110 having the smallest bandwidth and linear filter 130 having the largest bandwidth. The low-pass filters may be digital finite impulse response (FIR) filters or digital infinite impulse response (IIR) filters. The digital FIR filters may have (2d+1) taps. The first stage linear filter 130 may be a delay line which passes the entire bandwidth of the input signal and delays the propagation of the input signal by d samples.

The outputs of the first stage linear filters may be received by both the interference detector 135 and the signal switch 140. The interference detector 135 may compare and analyze the first stage filtered outputs and transmit a signal to the signal switch 140. The signal switch 140 may output one of the first stage filtered outputs based on the signal received from the interference detector 135.

Figure 2:
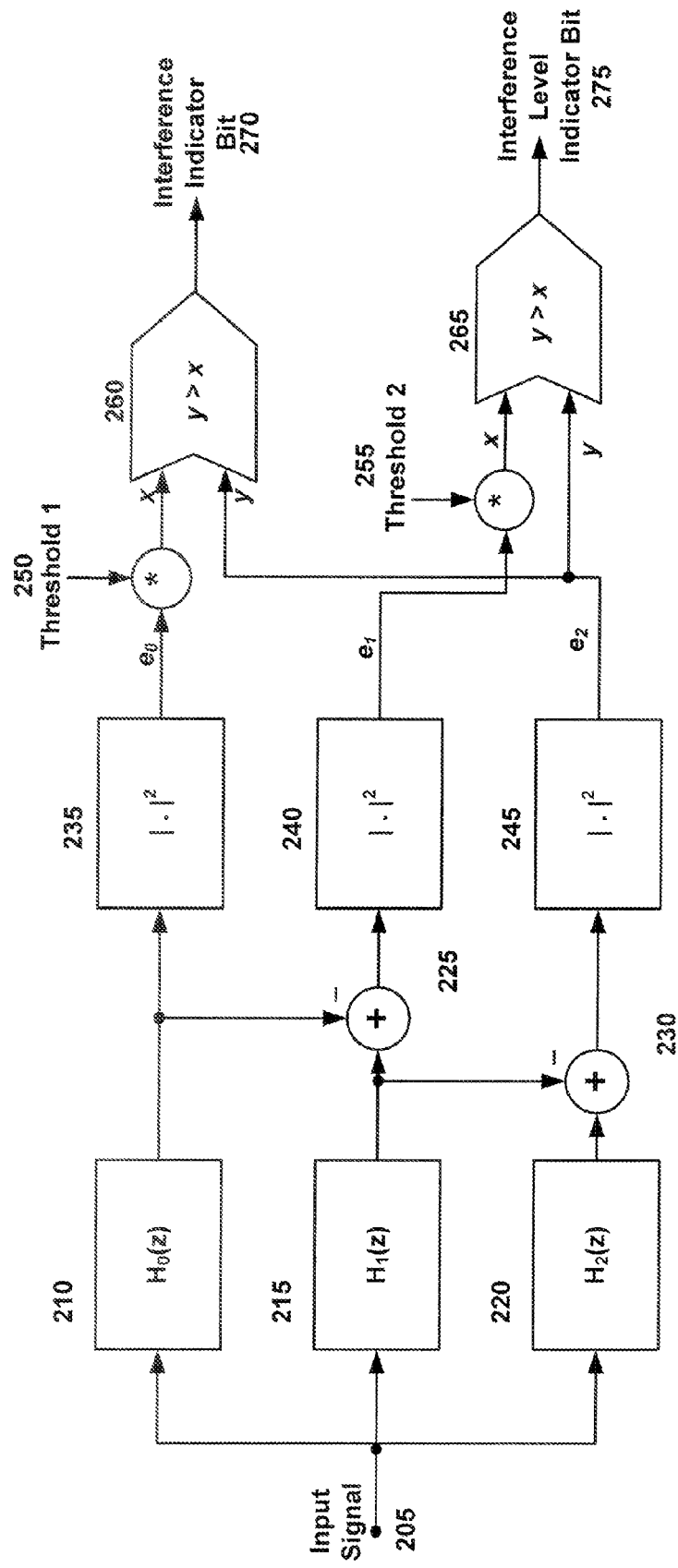
FIG. 2 is a block diagram of one embodiment of an interference detector for a dynamic bandwidth filter, wherein the first stage of linear filters includes two low-pass filters and a full bandwidth delay line.

FIG. 2 illustrates an embodiment for an adaptive bandwidth filter which includes as first stage linear filters, two low-pass filters 210, 215 and a delay line 220 with a delay substantially similar to the delays of the two low-pass filters. The first low-pass filter, $H_0(z)$ 210, may have the smallest bandwidth of the three first stage linear filters and may attenuate the input signal above a first frequency, e.g. 75 KHz. The second low-pass filter, $H_1(z)$ 215, may attenuate the input signal above a second frequency, e.g. 90 KHz. The delay line, $H_2(z)$ 220, may have the largest bandwidth of the three first stage linear filters and may pass the entire bandwidth of the input signal (e.g. 0-132.3 KHz) via a delay line, as in FIG. 1.

Other embodiments may include multiple first stage linear filters. In these situations, the first stage linear filters may be arranged in order of increasing bandwidth. A first low-pass filter may have the smallest bandwidth among the first stage filters. A last filter may be a delay line, which passes the full bandwidth of the input signal. In between the first and last filters may be one or more low-pass filters of varying bandwidths. As an example, an adaptive bandwidth filter may have four first stage linear filters, consisting of a 75 KHz low-pass filter, a 90 KHz low-pass filter, a 105 KHz low-pass filter, and a delay line which passes the entire signal bandwidth (e.g. 0-132.3 KHz).

FIG. 2 also illustrates an embodiment for an interference detector 135. The interference detector 135 may comprise a plurality of second stage linear filters 225, 230, signal energy calculation circuits 235-245, threshold multipliers 250 and 255, and comparators 260 and 265. The interference detector 135 may receive the filtered signals from the first stage linear filters 110-130 and output an interference indicator bit 270 and an interference level indicator bit 275.

The second stage linear filters may include at least two band-pass filters 225, 230. Generally, the number of band-pass filters may equal (n-1) total first stage linear filters in the dynamic bandwidth filter architecture. Each of the band-pass filters 225, 230 may be designed to receive as an input the filtered signals from the first stage of linear filters and further filter the signal to pass a narrower bandwidth of the signal. Moreover, each band-pass filter 225, 230 may pass differing bandwidths of the signal.

In one embodiment, each band-pass filter 225, 230 in the second stage may filter the output signal of the nth first stage filter by attenuating its bandwidth by the bandwidth of the output of the (n−1)st first stage filter. For instance, where n=3, and the three first stage filters—$H_0(z)$, $H_1(z)$, and $H_2(z)$—are a 75 KHz low-pass filter, a 90 KHz low-pass filter, and a delay line, the first band-pass filter 225 may filter the output of the $H_1(z)$ low-pass filter 215 such that only the bandwidth between 75 KHz and 90 KHz is passed. A second band-pass filter 230 may filter the output of the $H_2(z)$ delay line 220 such that only the bandwidth between 90 KHz and 132.3 KHz is passed. In this embodiment, the output of the $H_0(z)$ low-pass filter 210 may not undergo second stage filtering.

If the dynamic bandwidth filter architecture uses more than three first stage linear filters, each additional first stage linear filter may be subject to filtering by a second stage band-pass filter. For exemplary purposes, if a third first stage low-pass filter, $H_2(z)$, is added to the example described above, with the delay line becoming $H_3(z)$, the output of the $H_2(z)$ low-pass filter may be filtered by a second stage band-pass filter such that the bandwidth of the output of $H_2(z)$ is attenuated by the bandwidth of the output of $H_1(z)$.

From the foregoing, it can be seen that, in one embodiment, the inventive dynamic bandwidth filter architecture uses the first stage linear filters and the second stage linear filters to isolate the bandwidth of the input signal into several bandwidth components. The output signal of the smallest bandwidth low-pass filter may represent the lower frequency bandwidth component of the input signal. The output signal(s) of the one or more low-pass filters which pass larger bandwidths and which have been further filtered by one or more band-pass filters may represent one or more middle frequency bandwidth segments of the input signal. The output signal of a delay line which passes the entire bandwidth of the input signal and which is further filtered by a second stage band-pass filter may represent the upper frequency bandwidth component of the input signal. The upper frequency bandwidth component may tend to indicate or approximate the presence of interference.

Signal energy calculation circuits 235-245 in FIG. 2 may calculate the signal energy of the various signal bandwidth components of the input signal using the general formula:

$$\varepsilon_n = \sum_{n=-\infty}^{\infty} |x[n]|^2,$$

where x[n] represents the signal whose energy is being calculated. In some embodiments of the present invention, as shown in FIG. 2, the output of the first stage low-pass filter with the smallest bandwidth may pass directly to a signal energy calculation circuit without further filtering by a second stage band-pass filter. Also as shown in FIG. 2, the outputs of other first stage linear filters may be subject to further filtering by second stage band-pass filters before their respective signal energies are calculated.

FIG. 2 illustrates one embodiment of the interference detector in which the detector has two low-pass filters, $H_0(z)$ 210 and $H_1(z)$ 215, and a delay line, $H_2(z)$ 220, as its first stage linear filters, and two second stage band-pass filters 225 and 230. The signal energy calculation circuit 235 may calculate the signal energy of the output signal of the $H_0(z)$ low-pass filter 210 (i.e. the filter with the smallest bandwidth) and output a signal energy calculation $e_0$. The outputs of the first stage filters $H_1(z)$ 215 and $H_2(z)$ 220 may be filtered by second stage band-pass filters 225 and 230 before signal energy calculation circuits 240 and 245 calculate and output signal energies $e_1$ and $e_2$ for the output signals of the band-pass filters 225, 230 respectively.

The resulting signal energy values $e_0$, $e_1$, and $e_2$ may be passed to threshold multipliers 250, 255. The threshold multipliers 250, 255 may multiply the signal energy values of low (i.e. $e_0$) and middle (i.e. $e_1$) frequency bandwidth components of the input signal with a threshold value to provide a proper basis for comparing these signal energies with the signal energy of the upper frequency (i.e. $e_2$) filtered bandwidth component of the input signal. The threshold values, Threshold 1 250 and Threshold 2 255, as illustrated in FIG. 2 for an embodiment including two first stage low-pass filters and a delay line, may be different. Moreover, depending on the country in which the present invention is used, the values for Threshold 1 250 and Threshold 2 255 may change to reflect differences in various countries' FM transmission requirements. Further, the values for Thresholds 1 250 and 2 255 may change over time or if new FM transmission requirements are adopted by various countries. In one embodiment, in the United States, Threshold 1 250 may have a value of 0.03, and Threshold 2 250 may have a value of 1.00. However, these values are purely exemplary and subject to change over time and are dependent on the FM transmission requirements set by a country. If additional low-pass filters are included in the first stage linear filters, additional threshold values may be employed to manipulate the output signals resulting from the additional low-pass filters.

A plurality of comparators may receive the signal energy levels of the various filtered bandwidth components of the input signal as inputs after threshold manipulation and may output indicator bits depending on the results of the signal energy comparisons. In one embodiment, as shown in FIG. 2, a first comparator 260 may compare the signal energy of the lower frequency bandwidth segment of the input signal, $e_0$, with the upper frequency bandwidth segment of the input signal, $e_2$. The first comparator 260 may output an interference indicator bit 270 based on the results of the comparison to indicate whether interference with the input signal is relatively strong or weak. If $e_2$ is greater than $e_0$, the comparator may output a true value for the interference indicator bit 270 to show that interference with the input signal is relatively strong. Similarly, a second comparator 265 may compare the signal energy of the middle frequency bandwidth component of the input signal, $e_1$, with the signal energy of the upper frequency bandwidth segment of the input signal, $e_2$. The second comparator 265 may output an interference level indicator bit 275 to indicate the level of interference with the input signal. The relative strength of the signal energy of the upper frequency bandwidth segment of the input signal as compared to the signal energy of the middle frequency bandwidth component of the input signal may indicate that the input signal is relatively weak. On the other hand, the relative strength of the signal energy of the middle frequency bandwidth component of the input signal as compared to the signal energy of the high frequency bandwidth component of the input signal tends to show that noise and other forms of interference do not greatly interfere with the input signal up to this middle frequency bandwidth.

For embodiments of the interference detector which have more than two first stage low-pass filters, additional comparators may be employed to compare the additional signal bandwidth components of the input signal to the upper frequency bandwidth component of the input signal. For example, if four low-pass filters are included in the first stage linear filters, where the four low-pass filters are a 75 KHz low-pass filter, a 90 KHz low-pass filter, a 105 KHz low-pass filter, and a 120 KHz low-pass filter, four comparators may be used to compare the resulting output signals to the upper frequency bandwidth component of the input signal. A first comparator may compare the signal energy of the 75 KHz bandwidth signal with that of the upper frequency (e.g. 120-132.3 KHz) bandwidth signal to determine whether interference with the input signal is relatively strong or weak. This comparator may serve the same function as the first comparator 260 in FIG. 2.

A second of the four comparators may compare the signal energy of the 75-90 KHz bandwidth of the input signal (derived from filtering by the 90 KHz first stage low-pass filter and subsequent filtering by a band-pass filter which passes the 75-90 KHz bandwidth range) to the signal energy of the upper frequency bandwidth component. If the signal energy of the upper frequency component is greater than the energy of the 75-90 KHz component, then the input signal may be considered relatively weak. Accordingly, rather than outputting an input signal with a bandwidth of 0-90 KHz, the dynamic bandwidth filter may output an input signal with only a minimal bandwidth (e.g. a 0-75 KHz bandwidth signal passed by the first stage low-pass filter with the smallest bandwidth) so as to reduce or minimize the effects of interference with the input signal. If the signal energy of the 75-90 KHz component is greater, then the input signal may be considered relatively strong for this bandwidth component. The dynamic bandwidth filter may then repeat the comparison using the third of four comparators to compare the 90-105 KHz bandwidth component against the upper frequency bandwidth component (120-132.3 KHz in this case), and so forth for the remaining comparators.

For embodiments of the interference detector in which the first stage of linear filters includes more than two low-pass filters, rather than using multiple comparators to account for the additional low-pass filters, an embodiment of the interference detector instead may use and modify the same two comparators as found in FIG. 2. The first comparator of FIG. 2 may still compare the signal energy of the lowest frequency bandwidth component with the signal energy of the highest frequency bandwidth component to determine whether the interference with the input signal is relatively strong or weak. However, the second comparator of FIG. 2 may be modified to accept multiple inputs instead of two inputs as disclosed in FIG. 2. These multiple inputs may represent the various bandwidth components of the input signal (e.g. 75-90 KHz, 90-105 KHz, 105-120 KHz, etc.) created by the first stage low-pass filtering and the second stage band-pass filtering. The modified second comparator may contain additional logic components to make multiple comparisons of the signal energies of the various bandwidth components of the input signal with the signal energy of the high frequency bandwidth component. Similar to the second comparator 265 of FIG. 2, the modified second comparator may output an interference level indicator bit or bits to denote the relative strength of the interference (e.g. the upper frequency bandwidth component of the input signal) as compared to the signal energy of the various bandwidth components of the input signal.

The interference indicator bit 270 and the interference level indicator bit(s) 275 may be output by the interference detector 135 and received as inputs by the signal switch 140. The signal switch 140 may also receive the filtered output signals of the first stage linear filters as inputs. In one embodiment in which the first stage linear filters include two low-pass filters—$H_0(z)$ and $H_1(z)$—and a delay line, $H_2(z)$, the resulting filtered signals outputted from the first stage linear filters may be inputted into the signal switch 140. The signal switch 140 may use the interference indicator bit 270 and the interference level indicator bit 275 to determine which of the three filtered signals to output to the FM receiver. In this embodiment, the signal switch 140 may output three possible signals. If the interference indicator bit 270 and the interference level indicator bit 275 both have a value of true or '1', the signal switch 140 may select the output of the $H_0(z)$ low-pass filter as the output to the FM receiver. The output of the $H_0(z)$ low-pass filter may be outputted because a value of true for both the interference indicator bit 270 and the interference level indicator bit 275 may reveal that the strength of the upper frequency and lower frequency bandwidth components of the input signal. In such circumstances, the dynamic bandwidth filter may choose to output the smallest bandwidth of the input signal to reduce or minimize interference with the input signal. If the interference indicator bit 270 has a value of true or '1', but the interference level indicator bit 275 has a value of false or '0', the signal switch 140 may select the output of the $H_1(z)$ low-pass filter as the output to the FM receiver. This conclusion may be reached under the premise that while interference may exist and affect the lower frequency bandwidth component of the input signal, the signal energy of the middle frequency bandwidth component is relatively stronger than that of the high frequency bandwidth component, such that an output signal consisting of a combination of the lower and middle frequency components of the input signal may not be greatly affected by interference. If the interference indicator bit 270 and the interference level indicator bit 275 both have a value of false or '0', the signal switch 140 may output an interpolated signal to the FM receiver under the premise that interference with the low and middle frequency components as compared to the upper frequency component of the input signal is weak or non-existent. The interpolated signal may be constructed by interpolation between the signal representing the middle frequency bandwidth component, $H_1(z)$, and the signal representing the full bandwidth of the input signal, $H_2(z)$. This interpolation may be accomplished linearly.

Figure 3:
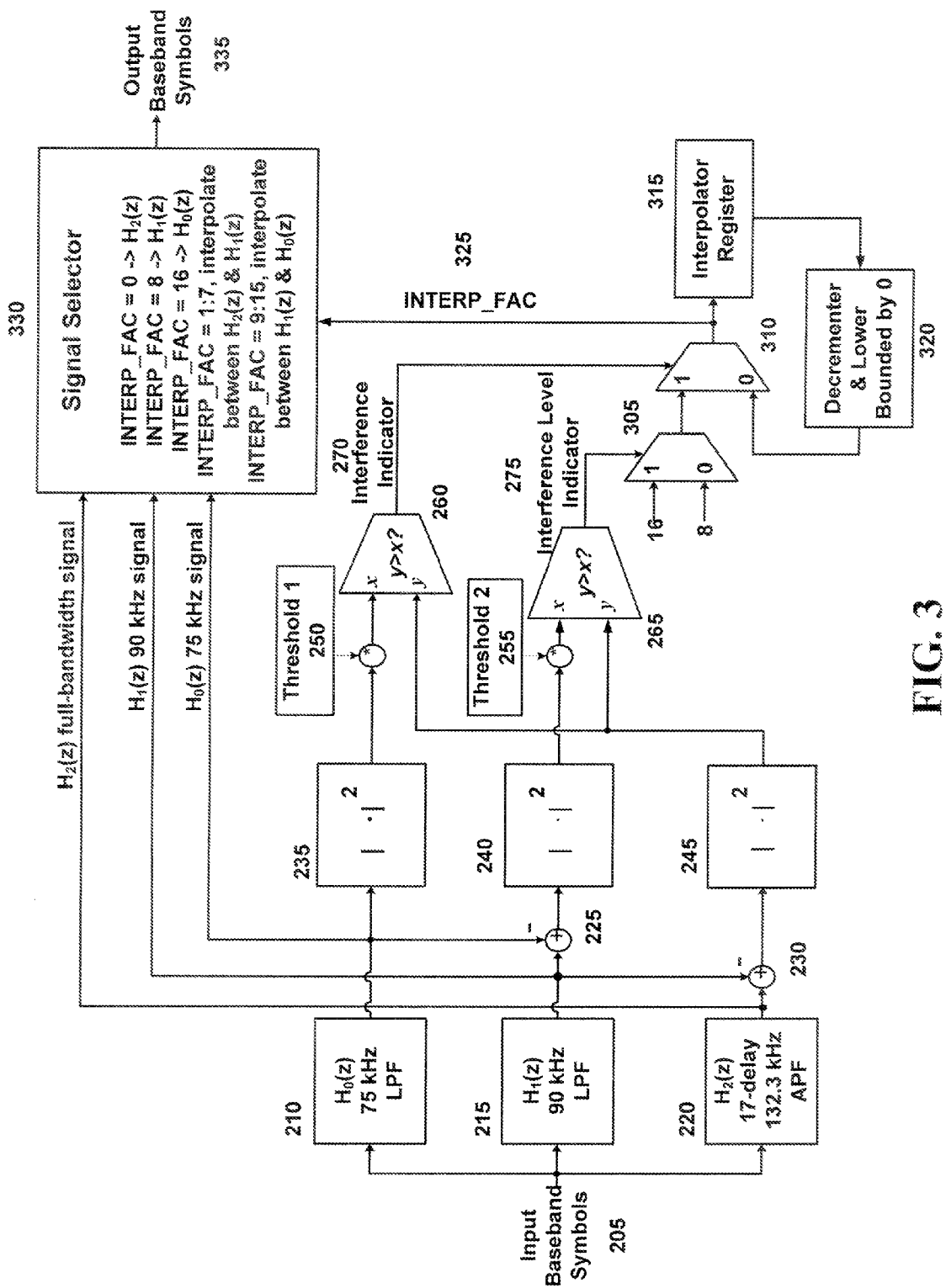
FIG. 3 is a block diagram of one embodiment of a dynamic bandwidth filter, and in particular, of one embodiment involving the interpolation of first stage filtered output signals.

FIG. 3 illustrates a block diagram of one embodiment of a dynamic bandwidth filter, and in particular, of one embodiment involving the interpolation of filtered first stage output signals. In this embodiment, interpolation of filtered first stage output signals may be accomplished using a third comparator 305, a fourth comparator 310, an interpolator register 315, a decrementer 320, an interpolation factor signal 325, and a signal selector 330. The third comparator 305 may receive the interference level indicator bit 275 and output a value based on the interference level indicator bit 275. This outputted value may correspond to the different frequency components of the input signal. In one embodiment, the third comparator 305 may output either a value of 16 or 8 depending on the interference level indicator bit 275. The value 16 may correspond to the output of the first stage low-pass filter $H_0(z)$ 210, whereas the value 8 may correspond to the output of the first stage low-pass filter $H_1(z)$ 215. The outputted value and the output of the decrementer 320 may be received as inputs by a fourth comparator 310. The decrementer 320 may obtain the value stored in the interpolator register 315 and decrement it by one before passing the decremented value to the second switch 310. Initially, the interpolator register 315 may hold an interpolation value corresponding to the output of the first stage low-pass filter $H_0(z)$ 210. The decrementer 320 may be lower-bounded by zero. Upon receipt of the first switch 305 output or the decrementer 320 output, the fourth comparator 320 may select an output based on the value of the interference indicator bit 270. The fourth comparator 320 output may overwrite the value stored in the interpolator register 315 and also may be outputted to the signal selector 330 as the interpolation factor signal 325. Based on the value of the interpolation factor signal 325, the signal switch 330 may output one of the first stage filtered signals or an interpolated signal based on the first stage filtered signals.

The third comparator 305 may select an output value based on the value of the interference level indicator bit 275. If the interference level indicator bit 275 has a value of true, indicating that interference affects the input signal, the third comparator 305 may output a first interpolation value corresponding to the first stage low-pass filter, $H_0(z)$ 210, representing the lower frequency component of the input signal (e.g. a value of 16 in FIG. 3). If the interference level indicator bit 275 has a value of false, indicating that interference does not greatly affect the input signal, the third comparator 305 may output a second interpolation value corresponding to the first stage low-pass filter $H_1(z)$ 215 (e.g. a value of 8 in FIG. 3). The selected value may pass as an input to the fourth comparator 310 along with the output of the decrementer 320. The fourth comparator 310 may select an output based on the value of the interference indicator bit 270. If the interference indicator bit 270 has a value of true, indicating that interference from the upper frequency component of the input signal is strong relative to the low frequency input signal component, then the fourth comparator 310 may select the output of the third comparator 305 (either 8 or 16 in this embodiment). This output may be stored in the interpolator register 315 and be sent to the signal selector 330 as the interpolation factor signal 325. The signal selector 330 may then output a frequency component of the input signal corresponding to the value of the interpolation factor signal 325.

If the interference indicator bit has a value of false, indicating that interference from the upper frequency input signal component is relatively weak compared to the low frequency input signal component, then the fourth comparator 310 may select the decrementer 320 output as the interpolation factor signal 325 to be outputted to the signal selector 330. In one embodiment, given an initial value of 16 in the interpolator register 315, if the fourth comparator 310 selects the output of the decrementer 320, the decrementer 320 may decrement the interpolator register value by one and output a value of 15 as the interpolation factor signal 325 to be sent to the signal selector 330. The output of the decrementer 320 also may overwrite the initial value stored in the interpolation register 315. The decrementer 320 may be lower bounded by zero such that if the value in the interpolator register 315 is zero, the decrementer will not decrement the interpolator register value. Rather, if the output of the decrementer 320 is selected by the second switch 310, the interpolation signal 325 will have a value of zero and the interpolation register 315 will store a value of zero.

The signal selector 330 may receive the interpolation signal 325 along with the outputs of the first stage linear filters 210, 215, and 220 as inputs and may select an output baseband signal 335. The signal selected by the signal selector 330 is dependent on the value of the interpolation factor signal 325. In one embodiment, an interpolation factor signal 325 with a value of 16 may correspond to the output of the first stage low-pass filter with the smallest bandwidth (e.g. low-pass filter $H_0(z)$ 210). An interpolation factor signal 325 with a value of 8, the result of the interference indicator bit 270 having a value of true and the interference level indicator bit 275 having a value of false, may correspond to the middle frequency component of the input signal (i.e. the output of low-pass filter $H_1(z)$ 215). If the interpolation factor signal 325 has a value between 9 and 15, the signal selector may output an interpolated signal corresponding to an interpolation of the first stage filtered signals $H_0(z)$ 210 and $H_1(z)$ 215. The degree of interpolation between $H_0(z)$ 210 and $H_1(z)$ 215 may be dependent on the value of the interpolation factor signal. In one embodiment, the signal selector 330 may use linear interpolation. For example, given an interpolation factor signal value of 15, the signal selector 330 may output an interpolated signal having a bandwidth of 7 parts $H_0(z)$ 210 and 1 part $H_1(z)$ 215. For an interpolation factor signal value of 10, the signal selector 330 may output an interpolated signal having a bandwidth of 2 parts $H_0(z)$ 210 and 6 parts $H_1(z)$ 215. The effect of this interpolation may be to gradually increase the bandwidth of the output signal depending on the relative strength of the interference with the input signal.

Similarly, for an interpolation factor signal value of 0, the signal selector 330 may select the output of the first stage full-bandwidth delay line, $H_2(z)$ 220, as the output baseband signal 335. Where the interpolation factor signal 325 has a value between 1-7, the signal selector 330 may select an interpolated signal to be output. The interpolated output signal may be an interpolation of the $H_1(z)$ 215 and $H_2(z)$ 220 first stage filtered signals. Thus, depending on the values of the interference indicator bit 270 and the interference level indicator bit 275, the signal selector 330 may select as the output baseband signal 335 either a first stage filtered signal or an interpolated signal based on interpolation between two first stage filtered signals. The output signal 335 selected may reflect the relative strength or weakness of the input signal compared to the interference with the input signal.

For embodiments of the dynamic bandwidth filter containing more than two first stage low-pass filters, the signal switch may use similar logic to that described above to select an output signal to the FM receiver. If multiple comparators are used to compare the signal energies of the multiple low-pass filter outputs to that of the upper frequency bandwidth component of the input signal, multiple and separate interference level indicator bits may be used. If the interference indicator bit has a value of true, and the signal energy of the second lowest bandwidth component of the input signal is less than that of the highest frequency bandwidth component, the signal switch may output the lowest bandwidth component of the input signal. However, if the signal energy of the second lowest bandwidth component of the input signal is greater than that of the highest bandwidth component, the signal switch may examine the value of the interference level indicator bit which corresponds to the next higher bandwidth component of the input signal to determine whether to output the next smallest bandwidth of the input signal or to keep expanding the bandwidth of the input signal by increments corresponding to the differences in the bandwidths of the low-pass filters. If the signal energy of the upper frequency bandwidth component of the input signal is less than the signal energy of each of the various middle frequency bandwidths, the signal switch may output the largest bandwidth signal corresponding to the largest bandwidth low-pass filter. If the interference indicator bit has a value of false or '0', the signal switch may interpolate between the various low-pass filters and the delay line using similar types of interpolation as described above.

For embodiments of the dynamic bandwidth filter which have more than two low-pass filters and only two comparators in the interference detector, similar to those disclosed in FIG. 2, the signal switch may first examine the value of the interference indicator bit to determine whether interference with the lower frequency bandwidth component is relatively strong or weak. If the interference indicator bit has a value of true or '1', the signal switch may consider the value of the interference level indicator bit. For the modified second comparator as discussed above, in which more than two inputs are fed into the comparator, the resulting interference level indicator bit output may consist of multiple bits. The value of these multiple bits may indicate to the signal switch the appropriate bandwidth of the signal to be output to the FM receiver. If the interference indicator bit has a value of false or '0', the signal switch may gradually expand the bandwidth of the signal to be output to the FM receiver by interpolation. The interpolation may be similar to that described above, and is not solely limited to linear interpolation.

Figure 4:
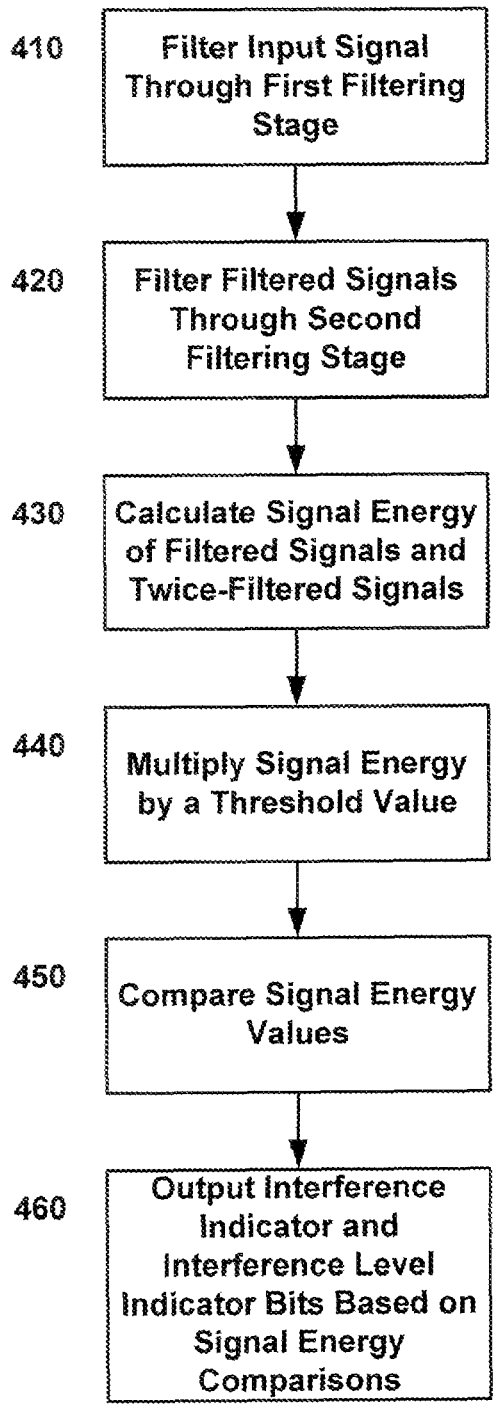
FIG. 4 is a flowchart showing an implementation of the inventive method.

FIG. 4 illustrates one embodiment of the inventive method. In this embodiment, the first filtering stage of the dynamic bandwidth filter may have three filters. Of the three filters, two may be low-pass filters and one may be a delay line. The delay line may pass the entire bandwidth of the input signal. The three filters may be arranged in order of increasing bandwidth. The first filtering stage filters may be digital filters. The digital low-pass filters and delay line may be digital finite impulse response (FIR) filters. Alternatively, the digital low-pass filters and delay line may be digital infinite impulse response (IIR) filters. In block 410, the filters each may receive the input signal as an input and may output a first filtered signal. In block 420, the second filtering stage of the dynamic bandwidth filter may receive the first set of filtered signals as inputs and filter the first set of filtered signals. The second filtering stage may be composed of (n−1) band-pass filters, where n is equal to the number of filters in the first filtering stage. Each second filtering stage band-pass filter may filter the nth first filtering stage output by attenuating the bandwidth of the nth first filtering stage output signal by the bandwidth of the (n−1)st first filtering stage output signal. The output signal of the first filtering stage low-pass filter with the smallest bandwidth may be unfiltered by the second filtering stage band-pass filters. Collectively, this output signal and the twice-filtered signals may comprise a second set of filtered output signals.

In block 430, signal energy calculation circuits may calculate the signal energy for each of the second set of filtered output signals and may output a third set of outputs. In block 440, threshold multipliers may multiply the signal energy values of those output signals having been originally filtered by the first filtering stage low-pass filters by threshold values. The threshold values may be different from each other and may change depending on the FM transmission requirements of various countries and changes to the FM transmission requirements of various countries over time. In one embodiment, the threshold values may be between 0 and 1. In block 450, the threshold-manipulated energy values may be compared individually with the non-threshold-manipulated signal energy value to determine the value of an interference indicator bit and an interference level indicator bit. The interference indicator bit may indicate whether interference with the input signal is relatively strong or weak, while the interference level indicator bit may show to what extent the interference interferes with the bandwidth of the input signal. These two bits values representing the outcomes of the comparisons may be output.

Figure 5:
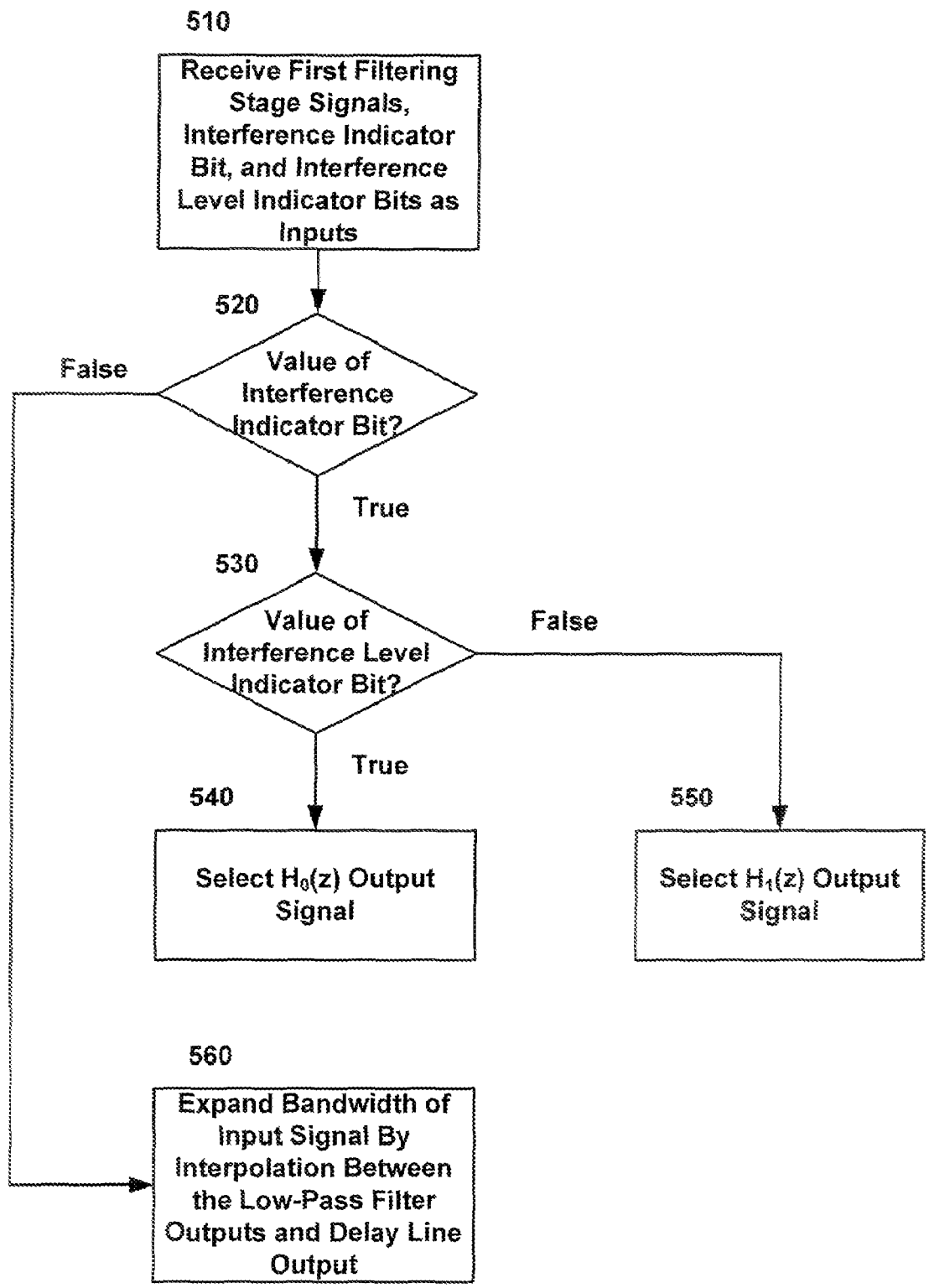
FIG. 5 is a flowchart showing an implementation of the inventive method, and more particularly, a method of how the signal switch component of the dynamic bandwidth filter selects a signal to be output to the FM receiver.

FIG. 5 illustrates one embodiment of the inventive method, and in particular, how the signal switch component of the dynamic bandwidth filter selects a signal as an output to the FM receiver. In block 510, the signal switch may receive as inputs the output signals of the first filtering stage filters, the interference indicator bit, and the interference level indicator bit. At decision point 520, the signal switch evaluates the value of the interference indicator bit. If the interference indicator bit has a value of true or '1', then at decision point 530, the signal switch may evaluate the value of the interference level indicator bit. If the interference level indicator bit has a value of true or '1', then in block 540, the signal switch may select the output of the first filtering stage low-pass filter with the smallest bandwidth as the output to the FM receiver. If the interference level indicator bit has a value of false or '0', then the signal switch may select the output of the first filtering stage low-pass filter with the larger bandwidth as an output to the FM receiver. If, at decision point 520, the value of the interference indicator bit is false or '0', the signal switch may output an interpolated signal to the FM receiver. In block 560, the signal switch may use linear interpolation or other types of interpolation to gradually expand the bandwidth of the input signal. The bandwidth may be expanded by interpolating the bandwidths of the first filtering stage outputs (e.g. interpolation of the output signal of the first low-pass filter with the output signal of the second low-pass filter; and interpolation of the resulting signal with the output signal of the delay line). After each interpolation, the dynamic bandwidth filter may re-calculate and re-evaluate the values of the interference indicator bit and the interference level indicator bits to determine whether further interpolation is required.

Figure 6:
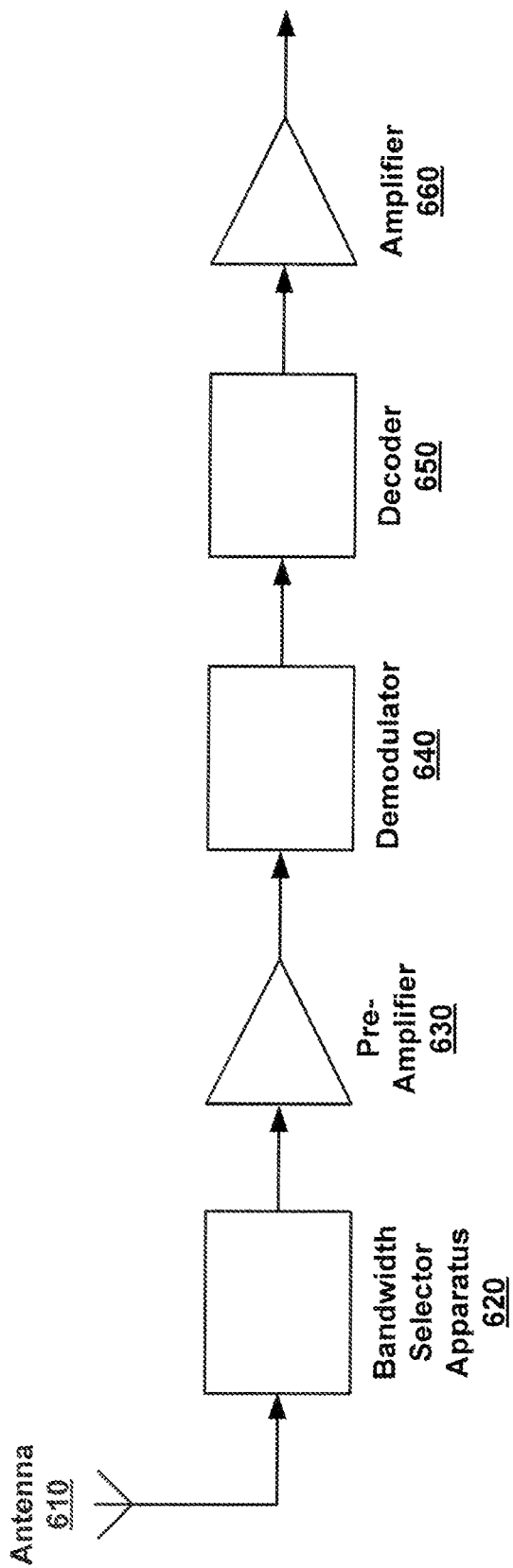
FIG. 6 is a block diagram of one embodiment of a FM receiver incorporating an apparatus for dynamically selecting a bandwidth for a received FM signal.

FIG. 6 is a block diagram of one embodiment of a FM receiver incorporating an apparatus for dynamically selecting a bandwidth for a received FM signal. The FM receiver may include an antenna 610 which receives a FM signal having a variable bandwidth. The FM signal may be filtered and processed by embodiments of the apparatus 620 described above. Based on the relative strengths of the various bandwidth components of the received FM signal, as described above, the apparatus 620 may select and output a filtered FM signal of a certain bandwidth. The filtered FM signal may be amplified by a pre-amplifier 630 for further processing by the FM receiver. A demodulator 640 may demodulate the pre-amplified FM signal to extract modulated audio data. Once synchronized, the FM signal may be decoded by a decoder 650 into its component parts, such as right and left audio channels. The decoded signal may be amplified by an amplifier 660, which in some embodiments may be a power amplifier. The amplifier signal may be output to a speaker (not shown). The above FM receiver embodiment is intended to illustrate one embodiment for incorporating the bandwidth selector apparatus described above into a FM receiver. One skilled in the art will recognize that other components may be included or used in a FM receiver to process a received FM signal, and that the placement or coupling of the bandwidth selector apparatus to other components may differ for different FM receivers.

Embodiments of the invention described above may be used in or incorporated in receivers where it is desirable to reduce or eliminate noise or other interference with a transmitted signal. For example, embodiments of the invention describe above may be used to improve the reception of a FM signal received by a FM receiver. In addition to these exemplary embodiments, those skilled in the art will recognize that numerous applications of the above-described embodiments are possible, and that disclosure of the just-described applications does not limit the invention to these applications. Rather, all suitable applications fall within the scope of the invention.

Therefore, the foregoing is illustrative only of the principles of the invention. Further, those skilled in the art will recognize that numerous modifications and changes are possible, the disclosure of the just-described embodiments does not limit the invention to the exact construction and operation shown, and accordingly, all suitable modifications and equivalents fall within the scope of the invention.

What is claimed is:

1. An apparatus to reduce interference with an input signal received by an FM receiver, the apparatus comprising:
   a first filtering stage receiving a plurality of inputs and providing a first plurality of outputs;
   an interference detector, receiving said first plurality of outputs, and comprising a second filtering stage, an energy calculation stage, and a first comparator stage;
   an interpolation stage, receiving outputs from said first comparator stage, and comprising a second comparator stage, an interpolation register, and a decrementer, for providing an interpolation factor signal; and
   a signal selector for outputting one of said first plurality of outputs or an interpolated output corresponding to an interpolation among said first plurality of outputs based on said interpolation factor signal.

2. The apparatus of claim 1, wherein said first filtering stage comprises first and second low-pass filters and a delay line.

3. The apparatus of claim 2, wherein said two low-pass filters and said delay line are digital finite impulse response (FIR) filters.

4. The apparatus of claim 2, wherein said two low-pass filters and said delay line are digital infinite impulse response (IIR) filters.

5. The apparatus of claim 2, wherein said first plurality of outputs from said first filtering stage comprises a first filtered output from said first low-pass filter, a second filtered output from said second low-pass filter, and a third filtered output corresponding to said delay line; said first comparator stage comprises first and second comparators, said first comparator receiving a first value corresponding to said first filtered output and a third value corresponding to said third filtered output, and said second comparator receiving a second value corresponding to said second filtered output and said third value corresponding to said third filtered output,
   wherein said second comparator stage comprises third and fourth comparators, said third comparator receiving a first interpolation value corresponding to said first filtered output and a second interpolation value corresponding to said second filtered output, and said fourth comparator receiving one of said first interpolation value or said second interpolation value and a decrementer output; and
   wherein said signal selector receives said interpolation factor signal and outputs said first filtered output if said interpolation factor signal equals said first interpolation value; said switch outputs said second filtered output if said interpolation factor signal equals said second interpolation value; said switch outputs said third filtered output if said interpolation factor signal equals a third interpolation value corresponding to said third filtered output; and said switch outputs a first interpolated output if said interpolation factor signal has a value between said first interpolation value and said second interpolation value and a second interpolated output if said interpolation factor signal has a value between said second interpolation value and said third interpolation value.

6. The apparatus of claim 5, wherein said first interpolated output is calculated using linear interpolation between said first and second filtered outputs and said second interpolated output is calculated using linear interpolation between said second and third filtered outputs.

7. The apparatus of claim 6, wherein said linear interpolation between said first and second filtered outputs produces a first plurality of different interpolated outputs corresponding to different linear combinations of said first and second filtered outputs, and wherein said linear interpolation between said second and third filtered outputs produces a second plurality of different interpolated outputs corresponding to different linear combinations of said second and third filtered outputs, said switch outputting one of said interpolated outputs responsive to said interpolation factor signal.

8. The apparatus of claim 2, wherein said second filtering stage comprises a plurality of linear filters receiving said first plurality of outputs and providing a second plurality of outputs, said first plurality of outputs comprising at least a first filtered output from said first low-pass filter, a second filtered output from said second low-pass filter, and a third filtered output corresponding to said delay line.

9. The apparatus of claim 8, wherein said plurality of linear filters includes at least two band-pass filters.

10. The apparatus of claim 9, wherein said second plurality of outputs comprises at least said first filtered output, a first twice-filtered output from said first band-pass filter and based on said second filtered output, and a second twice-filtered output from said second band-pass filter and based on said third filtered output.

11. The apparatus of claim 10, wherein said energy calculation stage receives said second plurality of outputs and provides a third plurality of outputs, said third plurality of outputs comprising a first energy value corresponding to said first filtered output, a second energy value corresponding to said first twice-filtered output, and a third energy value corresponding to said second twice-filtered value.

12. The apparatus of claim 11, further comprising a threshold multiplier stage comprising at least two threshold multipliers, said threshold multiplier stage receiving said third plurality of outputs and outputting a fourth plurality of outputs, said fourth plurality of outputs comprising a first modified energy value outputted by said first threshold multiplier and equal to a first percentage of said first energy value, a second modified energy value outputted by said second threshold multiplier and equal to a second percentage of said second energy value, and said third energy value.

13. The apparatus of claim 12, wherein said comparator stage includes at least first and second comparators, said first comparator outputting a first indicator based on a first comparison between said first modified energy value and said third energy value, and said second comparator outputting a second indicator based on a second comparison between said second modified energy value and said third energy value.

14. A FM receiver, comprising:
   an antenna to receive a FM signal having a variable bandwidth;
   an apparatus according to claim 1 to receive said FM signal and output a filtered FM signal;
   a pre-amplifier to amplify said filtered FM signal;
   a demodulator to demodulate said pre-amplified FM signal; and
   an amplifier to amplify said demodulated FM signal.

15. The FM receiver of claim 14, wherein said first plurality of outputs from said first filtering stage comprises a first filtered output from a first low-pass filter, a second filtered output from a second low-pass filter, and a third filtered output corresponding to a delay line; said first comparator stage comprises first and second comparators, said first comparator receiving a first value corresponding to said first filtered output and a third value corresponding to said third filtered output, and said second comparator receiving a second value corresponding to said second filtered output and said third value corresponding to said third filtered output, wherein said second comparator stage comprises third and fourth comparators, said third comparator receiving a first interpolation value corresponding to said first filtered output and a second interpolation value corresponding to said second filtered output, and said fourth comparator receiving one of said first interpolation value or said second interpolation value and a decrementer output; and wherein said signal selector receives said interpolation factor signal and outputs said first filtered output if said interpolation factor signal equals said first interpolation value; said switch outputs said second filtered output if said interpolation factor signal equals said second interpolation value; said switch outputs said third filtered output if said interpolation factor signal equals a third interpolation value corresponding to said third filtered output; and said switch outputs a first interpolated output if said interpolation factor signal has a value between said first interpolation value and said second interpolation value and a second interpolated output if said interpolation factor signal has a value between said second interpolation value and said third interpolation value.

16. The FM receiver of claim 15, wherein said first interpolated output is calculated using linear interpolation between said first and second filtered outputs and said second interpolated output is calculated using linear interpolation between said second and third filtered outputs.

17. The FM receiver of claim 16, wherein said linear interpolation between said first and second filtered outputs produces a first plurality of different interpolated outputs corresponding to different linear combinations of said first and second filtered outputs, and wherein said linear interpolation between said second and third filtered outputs produces a second plurality of different interpolated outputs corresponding to different linear combinations of said second and third filtered outputs, said switch outputting one of said interpolated outputs responsive to said interpolation factor signal.

18. An apparatus to reduce interference with an input signal received by an FM receiver, comprising:
   first filtering means for receiving a plurality of inputs and providing a first plurality of outputs;
   interference detection means, receiving said first plurality of outputs, and comprising second filtering means for providing a second plurality of outputs based on said first plurality of outputs, means for calculating signal energies of said second plurality of outputs, and a first comparing stage;
   interpolation means, receiving outputs from said first comparing stage, and comprising a second comparing stage, an interpolation register, and decrementing means, for providing an interpolation factor signal; and
   selector means for outputting one of said first plurality of outputs or an interpolated output corresponding to an interpolation among said first plurality of outputs based on said interpolation factor signal.

19. The apparatus of claim 18, wherein said first filtering means comprises means for attenuating said plurality of inputs, and delay means for passing one of said plurality of inputs after a predetermined delay.

20. The apparatus of claim 19, wherein said means for attenuating and said delay means are digital finite impulse response (FIR) filters.

21. The apparatus of claim 19, wherein said means for attenuating and said delay means are digital infinite impulse response (IIR) filters.

22. The apparatus of claim 19, wherein said first plurality of outputs from said first filtering means comprises a first filtered output from a first attenuating means, a second filtered output from a second attenuating means, and a third filtered output corresponding to said delay means; said first comparing stage comprises first and second comparing means, said first comparing means receiving a first value corresponding to said first filtered output and a third value corresponding to said third filtered output, and said second comparing means receiving a second value corresponding to said second filtered output and said third value corresponding to said third filtered output, wherein said second comparing stage comprises third and fourth comparing means, said third comparing means receiving a first interpolation value corresponding to said first filtered output and a second interpolation value corresponding to said second filtered output, and said fourth comparing means receiving one of said first interpolation value or said second interpolation value and a decrementing means output; and wherein said selector means receives said interpolation factor signal and outputs said first filtered output if said interpolation factor signal equals said first interpolation value; said selector means outputs said second filtered output if said interpolation factor signal equals said second interpolation value; said selector means outputs said third filtered output if said interpolation factor signal equals a third interpolation value corresponding to said third filtered output; and said selector means outputs a first interpolated output if said interpolation factor signal has a value between said first interpolation value and said second interpolation value and a second interpolated output if said interpolation factor signal has a value between said second interpolation value and said third interpolation value.

23. The apparatus of claim 22, wherein said first interpolated output is calculated using linear interpolation between said first and second filtered outputs and said second interpolated output is calculated using linear interpolation between said second and third filtered outputs.

24. The apparatus of claim 23, wherein said linear interpolation between said first and second filtered outputs produces a first plurality of different interpolated outputs corresponding to different linear combinations of said first and second filtered outputs, and wherein said linear interpolation between said second and third filtered outputs produces a second plurality of different interpolated outputs corresponding to different linear combinations of said second and third filtered outputs, said selector means outputting one of said interpolated outputs responsive to said interpolation factor signal.

25. The apparatus of claim 19, wherein said second filtering means comprises means for selectively passing a plurality of bandwidths, said second filtering means receiving said first plurality of outputs and providing a second plurality of outputs, said first plurality of outputs comprising at least a first filtered output from a first attenuating means, a second filtered output from said second attenuating means, and a third filtered output corresponding to said delay means.

26. The apparatus of claim 25, wherein said means for selectively passing a plurality of frequency ranges includes first means for selectively passing a first bandwidth and second means for selectively passing a second bandwidth.

27. The apparatus of claim 26, wherein said second plurality of outputs comprises at least said first filtered output, a first twice-filtered output from said first bandwidth passing means and based on said second filtered output, and a second twice-filtered output from said second bandwidth passing means and based on said third filtered output.

28. The apparatus of claim 27, wherein said energy calculating means receives said second plurality of outputs and provides a third plurality of outputs, said third plurality of outputs comprising a first energy value corresponding to said first filtered output, a second energy value corresponding to said first twice-filtered output, and a third energy value corresponding to said second twice-filtered value.

29. The apparatus of claim 28, further comprising multiplying means for scaling said third plurality of outputs, said multiplying means receiving said third plurality of outputs and outputting a fourth plurality of outputs, said fourth plurality of outputs comprising a first modified energy value outputted by a first multiplying means and equal to a first percentage of said first energy value, a second modified energy value outputted by said second multiplying means and equal to a second percentage of said second energy value, and said third energy value.

30. The apparatus of claim 29, wherein said first comparing stage includes at least first and second comparing means, said first comparing means outputting a first indicator based on a first comparison between said first modified energy value and said third energy value, and said second comparing means outputting a second indicator based on a second comparison between said second modified energy value and said third energy value.

31. A method to reduce interference with an input signal received by an FM receiver, comprising:
  filtering a plurality of inputs through a first filtering stage to obtain a first plurality of outputs;
  filtering said first plurality of outputs through a second filtering stage to obtain a second plurality of outputs, said second plurality of outputs having sequential bandwidths equal in combination to a total bandwidth of said input signal;
  calculating signal energies of said second plurality of outputs;
  scaling said signal energies of a plurality of said second plurality of outputs by predetermined threshold values;
  comparing said scaled signal energies with an unscaled signal energy of one of said second plurality of outputs;
  responsive to said comparing, generating an interpolation factor signal; and
  responsive to said interpolation factor signal, outputting one of said first plurality of outputs or an interpolated output corresponding to an interpolation among said first plurality of outputs.

32. The method of claim 31, wherein said plurality of inputs are filtered through first and second low-pass filters and a delay line.

33. The method of claim 32, wherein said first plurality of outputs from said first filtering stage comprises a first filtered output from said first low-pass filter, a second filtered output from said second low-pass filter, and a third filtered output corresponding to said delay line; said signal energy comparing including a first comparison of a first value corresponding to said first filtered output and a third value corresponding to said third filtered output, and a second comparison of a second value corresponding to said second filtered output and said third value corresponding to said third filtered output,
  wherein said interpolation factor signal is generated by selecting a first interpolation value corresponding to said first filtered output or a second interpolation value corresponding to said second filtered output based on said second comparison, and selecting one of said first interpolation value and said second interpolation value or a decrementing means output based on said first comparison; and
  wherein said first filtered output is output if said interpolation factor signal equals said first interpolation value; said second filtered output is output if said interpolation factor signal equals said second interpolation value; said third filtered output is output if said interpolation factor signal equals a third interpolation value corresponding to said third filtered output.

34. The method of claim 33, further comprising interpolating said first filtered output and said second filtered output and outputting a first interpolated signal if said interpolation factor signal has a value between said first interpolation value and said second interpolation value, and interpolating said second filtered output and said third filtered output and outputting a second interpolated signal if said interpolation factor signal has a value between said second interpolation value and said third interpolation value.

35. The method of claim 34, wherein said first interpolated signal is calculated using linear interpolation between said first and second filtered outputs and said second interpolated signal is calculated using linear interpolation between said second and third filtered outputs.

36. The method of claim 35, wherein said linear interpolation between said first and second filtered outputs produces a first plurality of different interpolated signals corresponding to different linear combinations of said first and second filtered outputs, and wherein said linear interpolation between said second and third filtered outputs produces a second plurality of different interpolated signals corresponding to different linear combinations of said second and third filtered outputs, one of said interpolated signals being outputted responsive to said interpolation factor signal.

37. The method of claim 32, wherein said first plurality of outputs are filtered by a plurality of linear filters to provide said second plurality of outputs, said first plurality of outputs comprising at least a first filtered output from said first low-pass filter, a second filtered output from said second low-pass filter, and a third filtered output corresponding to said delay line.

38. The method of claim 37, wherein said plurality of linear filters includes at least two band-pass filters, and wherein said second plurality of outputs comprises at least said first filtered output, a first twice-filtered output from said first band-pass filter and based on said second filtered output, and a second twice-filtered output from said second band-pass filter and based one said third filtered output.

39. The method of claim 38, wherein said signal energies of said second plurality of outputs are calculated to provide a third plurality of outputs, said third plurality of outputs comprising a first energy value corresponding to said first filtered output, a second energy value corresponding to said first twice-filtered output, and a third energy value corresponding to said second twice-filtered value.

40. The method of claim 39, wherein said signal energies are scaled to provide a fourth plurality of outputs, said fourth plurality of outputs comprising a first scaled energy value scaled by a first predetermined threshold and equal to a first percentage of said first energy value, a second scaled energy value scaled by a second predetermined threshold and equal to a second percentage of said second energy value, and third energy value.

41. The method of claim 40, wherein said comparing includes outputting a first indicator based on a first comparison of said first scaled energy value and said third energy value, and outputting a second indicator based on a second comparison between said second scaled energy value and said third energy value.

* * * * *